(12) United States Patent
Chen et al.

(10) Patent No.: US 12,486,940 B2
(45) Date of Patent: Dec. 2, 2025

(54) MOUNTING BRACKET AND DISPLAY DEVICE

(71) Applicant: UNILUMIN GROUP CO., LTD., Guangdong (CN)

(72) Inventors: Xiangjiang Chen, Guangdong (CN); Yulong Xiao, Guangdong (CN)

(73) Assignee: UNILUMIN GROUP CO., LTD., Guangdong (CN)

( * ) Notice: Subject to any disclaimer, the term of this patent is extended or adjusted under 35 U.S.C. 154(b) by 22 days.

(21) Appl. No.: 18/673,683

(22) Filed: May 24, 2024

(65) Prior Publication Data

US 2025/0216023 A1 Jul. 3, 2025

(30) Foreign Application Priority Data

Dec. 29, 2023 (CN) .......................... 202323669170.2

(51) Int. Cl.
*F16M 11/00* (2006.01)
*F16M 11/26* (2006.01)

(52) U.S. Cl.
CPC .................................. *F16M 11/26* (2013.01)

(58) Field of Classification Search
CPC .. F16M 11/26; F16M 2200/028; F16M 11/04; F16M 11/24; F16M 13/02
See application file for complete search history.

(56) References Cited

U.S. PATENT DOCUMENTS

| | | | |
|---|---|---|---|
| 4,250,348 A * | 2/1981 | Kitagawa | F16L 5/06 285/322 |
| 5,839,248 A * | 11/1998 | Liang | A47B 47/005 403/171 |
| 6,890,006 B2 * | 5/2005 | Crestin | H02G 15/04 285/342 |
| 8,196,872 B1 * | 6/2012 | McGrath | F16B 9/054 248/65 |
| 11,852,287 B2 * | 12/2023 | McGrath | F16M 11/24 |
| 2021/0140460 A1 | 5/2021 | Salmon | |

FOREIGN PATENT DOCUMENTS

CN 217875045 U 11/2022
EP 3645898 B1 5/2021

OTHER PUBLICATIONS

European Search Report; Application No. 24177456.1-1009, mailed Oct. 28, 2024; 8 pages.

* cited by examiner

*Primary Examiner* — Amy J. Sterling
(74) *Attorney, Agent, or Firm* — CANTOR COLBURN LLP

(57) ABSTRACT

Disclosed are a mounting bracket and a display device. The mounting bracket includes a rod body, a first connector, a second connector and a sleeve. The rod body has a first end and a second end disposed oppositely to each other along a first direction, the first direction is a lengthwise direction of the rod body; the first connector is connected to the first end; the second connector is connected to the second end; the sleeve is connected to the second end and is sleeved on the second connector, and the sleeve is capable of rotating the second connector so that the second connector is connected to the first connector of an adjacent mounting bracket, so as to realize the connection of the two adjacent mounting brackets.

14 Claims, 8 Drawing Sheets

MOUNTING BRACKET AND DISPLAY DEVICE

CROSS-REFERENCE TO RELATED APPLICATIONS

The present application claims the benefit of Chinese patent application No. 202323669170.2 filed on Dec. 29, 2023, titled "Mounting Bracket and Display Device", the entire contents of which are incorporated herein by reference.

TECHNICAL FIELD

The present application relates to the technical field of display screens, and in particular, to a mounting bracket and a display device.

BACKGROUND

With the continuous development of LED display technology, LED displays have been widely used in music performances, live broadcasts and other occasions. The display device includes a panel module, a box module, and a mounting bracket, with the panel module mounted on the box module and the box module mounted on the mounting bracket. In related technology, there are many parts between two adjacent mounting brackets, and the installation steps are complicated, resulting in inefficient installation and disassembly.

SUMMARY

Based on this, it is necessary to provide a mounting bracket and a display device for the connection of two adjacent mounting brackets.

A mounting bracket, which includes:
a rod body having a first end and a second end oppositely arranged along a first direction, the first direction being a lengthwise direction of the rod body;
a first connector connected to the first end;
a second connector connected to the second end; and
a sleeve connected to the second end and sleeved on the second connector, the sleeve can drive the second connector to rotate so that the second connector is able to be connected to a first connector of a mounting bracket adjacent to the second connector along the first direction.

In one embodiment, the mounting bracket further includes an elastic member and a locking member, the second end is provided with a locking groove, the locking member and the elastic member are both disposed in the sleeve, and the elastic member is sleeved on the second end, the sleeve can drive the second connector to rotate, so that the elastic member pushes the locking member to be engaged with the locking groove.

In one embodiment, a rotation groove is provided on the second end, the rotation groove extends along a circumferential direction of the second end, the locking groove extends along the first direction and is communicated with the rotation groove. The sleeve can move along the first direction relative to the second connector to drive the locking member to slide from the locking groove into the rotation groove.

In one embodiment, an outer wall surface of the second connector is provided with a first limiting surface, and an inner wall surface of the sleeve is provided with a second limiting surface matching the first limiting surface. The sleeve can slide along the first direction through the first limiting surface.

In one embodiment, a limiting connector is further provided. The limiting connector is disposed in the second connector and connected to the second end. The limiting connector is engageable into the first connector of an adjacent mounting bracket.

In one embodiment, the first connector is provided with a first through-hole, a wall of the first through-hole is provided with a first tapered surface, and an outer wall of the limiting connector is provided with a second tapered surface, the limiting connector can partially extend into a first through-hole of the first connector of the adjacent mounting bracket, and the second tapered surface is fitted to a first tapered surface of the first connector of the adjacent mounting bracket.

In one embodiment, one of the limiting connector and the second connector is provided with a protrusion, and the other one is provided with a recess, and the protrusion is engageable with the recess.

In one embodiment, a first thread is provided on an outer wall of the first connector, a second through-hole is provided on the second connector, and a second thread engageable with the first thread is provided on a wall of the second through-hole.

In one embodiment, an outer wall surface of the first connector includes a first smooth part and a first mounting part arranged at intervals, the first mounting part is provided with the first thread, and the first smooth part is a smooth wall surface.

An outer wall surface of the second connector includes a second smooth part and a second mounting part arranged at intervals, the second mounting part is provided with the second thread, and the second smooth part is a smooth wall surface.

The present application also provides a display device, which includes a panel module, a cabinet module and any of the above-mentioned mounting brackets. The panel module is installed on the cabinet module, and the cabinet module is connected to the mounting bracket.

The above-mentioned mounting bracket is provided with a first connector at the first end of the rod body, a second connector at the second end of the rod body, and a sleeve at the second end. The sleeve is sleeved on the second connector. When an adjacent mounting bracket is to be connected along the first direction, the sleeve drives the second connector to rotate, so that the second connector is connected to the first connector of the adjacent mounting bracket, so as to realize the connection of two adjacent mounting brackets along the first direction. With the mounting bracket provided by this application, the connection between two adjacent mounting brackets can be achieved by simply rotating the sleeve. The operation is simple and the connection or disassembly efficiency is improved.

Figure 1:
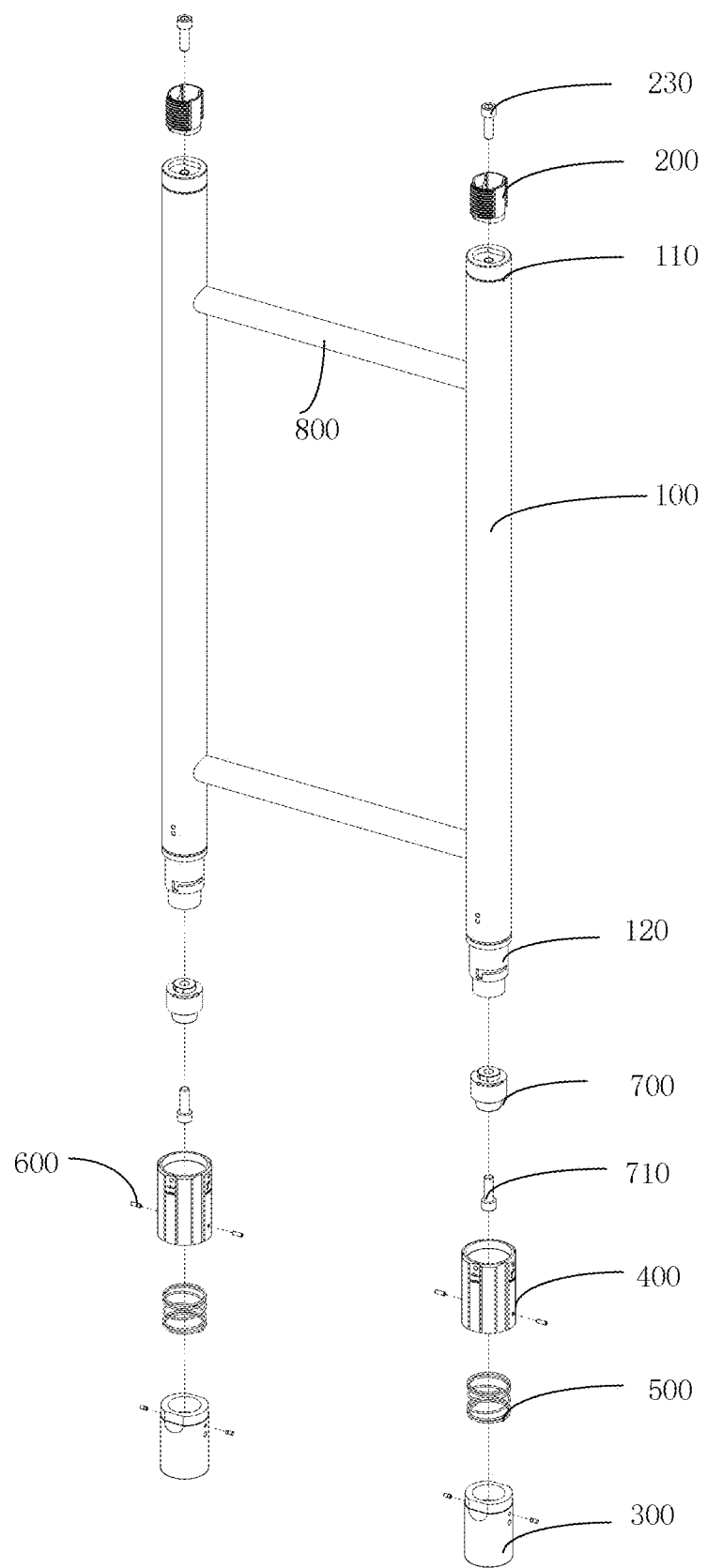
FIG. 1 is an exploded view of a mounting bracket provided by an embodiment of the present application.

Reference signs are as follows:

100 rod body; 110, first end; 120 second end; 121 locking groove; 122 rotation groove;
200 first connector; 210 first through-hole; 211 first tapered surface; 220 first thread; 230 first screw;
300 second connector; 310 first limiting surface; 320 second thread; 400 sleeve; 410 second limiting surface;
500 elastic member;
600 locking member;
700 limiting connector; 710 second screw; and
800 connecting piece.

DETAILED DESCRIPTION OF THE EMBODIMENTS

In order to make the above objects, features and advantages of the present application clearer and easy to understand, the specific implementation modes of the present application will be described in detail below with reference to the accompanying drawings. In the following description, specific details are set forth in order to provide a thorough understanding of the present application. However, the present application can be implemented in many other ways different from those described herein. Those skilled in the art can make similar improvements without departing from the concept of the present application. Therefore, the present application is not limited by the specific embodiments disclosed below.

In the description of this application, it should be understood that terms "center", "longitudinal", "transverse", "lengthwise", "widthwise", "thickness", "upper", "lower", ""front", "rear", "left", "right", "vertical", "horizontal", "top", "bottom", "inside", "outside", "clockwise", "counterclockwise", "axial", "radial", "circumferential", etc. indicating orientation or positional relationship are based on the orientation or positional relationship shown in the drawings, and are merely for the convenience of describing the present application and simplifying the description, rather than indicating or implying that the device or element referred to must have a specific orientation, be constructed and operate in a specific orientation, and therefore cannot be construed as limiting the present application.

In addition, terms "first" and "second" are used for descriptive purposes only and cannot be understood as indicating or implying the relative importance or implicitly indicating the quantity of the indicated features. Therefore, features defined as "first" and "second" may explicitly or implicitly include at least one of these features. In the description of this application, the term "a plurality of" means at least two, such as two, three, etc., unless otherwise expressly and specifically defined.

In this application, unless otherwise expressly stated and defined, terms "installed", "connected", "connection", "fixed", etc. should be interpreted in their broad meanings. For example, it can be a fixed connection or a detachable connection, or it can be integrally formed; it can be a mechanical connection or an electrical connection; it can be a direct connection or an indirect connection through an intermediate medium; it can be an internal communication between two components or interaction between two elements, unless otherwise expressly defined. For those of ordinary skill in the art, the specific meanings of the above terms in this application can be understood according to specific circumstances.

In this application, unless otherwise explicitly stated and defined, if a first feature is "on" or "below" etc. a second feature, the first and second features may be in direct contact, or the first and second features may be in indirect contact through an intermediary. Furthermore, the first feature is "above", "over" and "on" the second feature may mean that the first feature is directly above or diagonally above the second feature, or simply means that the first feature is higher in level than the second feature. The first feature is "below", "underneath" and "under" the second feature may mean that the first feature is directly below or diagonally below the second feature, or simply means that the first feature is lower in level than the second feature.

It should be noted that if an element is referred to as being "fixed to" or "disposed on" another element, it can be directly on the other element or an intervening element may also be present. If an element is referred to be "connected" to another element, it can be directly connected to the other element or there may also be an intervening element. If used, the terms "vertical", "horizontal", "upper", "lower", "left", "right" and similar expressions in this application are for illustrative purposes only and are not meant to be the only implementation.

The present application provides a mounting bracket, as shown in FIGS. 1 to 11. The mounting bracket includes a rod body 100, a first connector 200, a second connector 300 and a sleeve 400. The rod body 100 has a first end 110 and a second end 120 arranged oppositely in a first direction, the first direction is the lengthwise direction of the rod body 100. The first connector 200 is connected to the first end 110, and the second connector 300 is connected to the second end 120. The sleeve 400 is connected to the second end 120 and is sleeved on the second connector 300. The sleeve 400 can drive the second connector 300 to rotate, so that the second connector 300 is connected to the first connector 200 of an adjacent mounting bracket along the first direction.

The above-mentioned mounting bracket is provided with a first connector 200 at the first end 100 of the rod body 100, a second connector 300 at the second end 120 of the rod body 100, and a sleeve 400 at the second end 120. The sleeve 400 is sleeved on the second connector 300. When an adjacent mounting bracket is to be connected along the first direction, the sleeve 400 drives the second connector 300 to rotate, so that the second connector 300 is connected to the first connector 200 of the adjacent mounting bracket, so as to realize the connection of two adjacent mounting brackets along the first direction. With the mounting bracket provided by this application, the connection between two adjacent mounting brackets can be achieved by simply rotating the sleeve. The operation is simple, and the connection or disassembly efficiency is improved.

In some embodiments, as shown in FIGS. 1 to 11, two rod bodies 100 are provided, and the two rod bodies 100 are connected through a connecting piece 800. The first end 110 of each rod body 100 is provided with a first connector 200, and the second end 120 is provided with a second connector 300. The two rod bodies 100 are connected through the connecting piece 800, and the first end 110 of each rod body 100 is provided with a first connector 200, and the second end 120 is provided with a second connector 300. That is, the mounting bracket is in an H-shape. When connecting two adjacent mounting brackets, it is only necessary to connect the first connectors 200 and the second connectors 300 of the two adjacent mounting brackets correspondingly.

In some embodiments, as shown in FIGS. 1 to 11, a first thread 220 is provided on an outer wall of the first connector 200, a second through-hole is provided on the second connector 300, and a second thread 320 engageable with the first thread 220 is provided on the wall of the second through-hole. By providing the first thread 220 on the first connector 200 and the second thread 320 on the second connector 300, the first thread 220 and the second thread 320 are engaged, thereby connecting the first connector 200 and the second connector 300.

Preferably, the second thread 320 provided on the second connector 300 and the first thread 220 provided on the first connector 200 align perpendicularly when viewed from an axial direction. When the first connector 200 and the second connector 300 are connected, the second connector 300 only needs to be rotated by ¼ turn for a secured connection.

Specifically, as shown in FIGS. 1 to 11, the outer wall surface of the first connector 200 includes a first smooth part and a first mounting part arranged at intervals. The first mounting part is provided with the first thread 220, and the first smooth part is a smooth wall surface. The outer wall surface of the second connector 300 includes a second smooth part and a second mounting part arranged at intervals, the second mounting part is provided with the second thread 320, and the second smooth part is a smooth wall surface.

The first smooth part and the first mounting part are spaced apart on the outer wall of the first connector 200, and the second smooth part and the second mounting part are spaced apart on the outer wall of the second connector 300. That is, the first thread 220 is spaced apart from the smooth wall surface on the outer wall of the first connector 200. The second thread 320 is also spaced apart from the smooth wall surface on the outer wall of the second connector 300. Therefore, the first connector 200 and the second connector 300 can be thread-connected without too many rotations, only requiring relative rotation of a certain angle to lock or release, which makes the operation more convenient.

More specifically, the rotation angle of the first connector 200 and the second connector 300 is 90°.

In some embodiments, as shown in FIGS. 1 to 11, the first connector 200 is inserted into the end surface of the first end 110 of the rod body 100, and the first connector 200 and the first end 110 of the rod body 100 are connected through a first screw 230.

In some embodiments, as shown in FIGS. 1 to 11, the mounting bracket further includes an elastic member 500 and a locking member 600. The second end 120 is provided with a locking groove 121. The locking member 600 and the elastic member 500 are both provided inside the sleeve 400, and the elastic member 500 is sleeved on the second end 120. The sleeve 400 can drive the second connector 300 to rotate, so that the elastic member 500 pushes the locking member 600 to be engaged into the locking groove 121. By arranging the elastic member 500 and the locking member 600, the rotation of the sleeve 400 drives the second connector 300 to rotate, and while the sleeve 400 rotates, the elastic member 500 is compressed, so that the elastic member 500 can push the locking member 600 to be engaged with the locking groove 121 to realize locking.

Specifically, the elastic member 500 is a spring.

Specifically, the locking member 600 is connected to the inner wall surface of the sleeve 400, and the locking member 600 is a screw or a pin.

Specifically, as shown in FIGS. 1 to 11, a rotation groove 122 is provided on the second end 120. The rotation groove 122 extends along the circumferential direction of the second end 120. The locking groove 121 extends along the first direction and is communicated with the rotation groove 122. The sleeve 400 can move in the first direction relative to the second connector 300 to drive the locking member 600 to slide from the locking groove 121 to the rotation groove 122. By providing the rotation groove 122 and communicating the rotation groove 122 and the locking groove 121, the locking member 600 has a first state being positioned in the rotation groove 122 and a second state being positioned in the locking groove 121. By moving the sleeve 400 in the first direction, the locking member 600 is driven to switch between the locking groove 121 and the rotation groove 122. When the locking member 600 is in the rotation groove 122, the sleeve 400 can be further rotated, thereby driving the second connector 300 to rotate. That is, the locking member 600 is in an unlocked state when being in the rotation groove 122.

Figure 2:
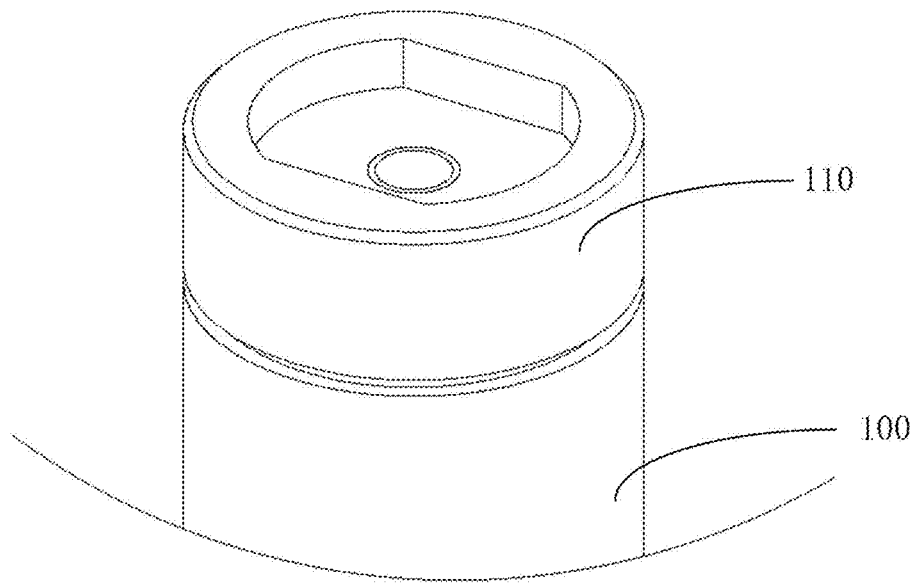
FIG. 2 is a schematic structural diagram of the first end provided by the embodiment of the present application.
Figure 3:
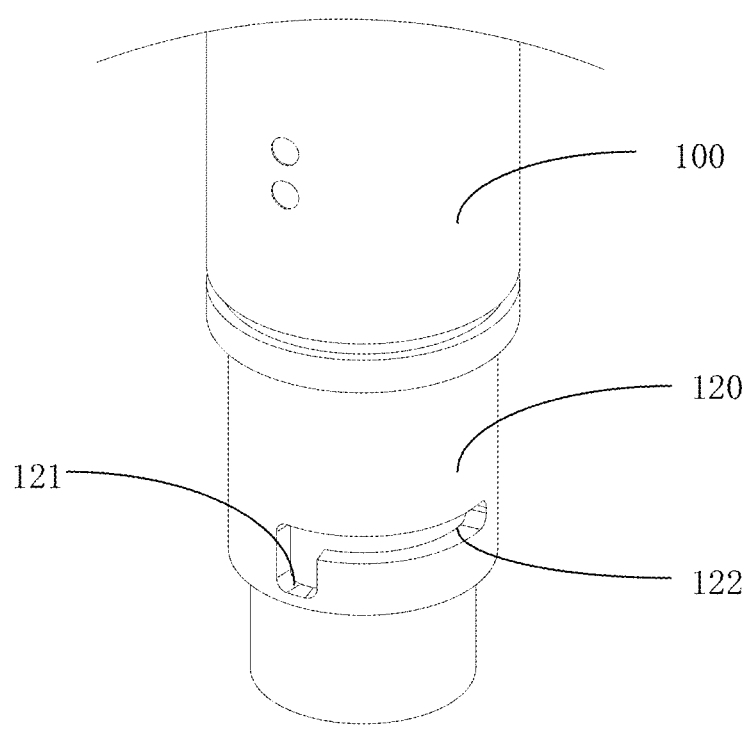
FIG. 3 is a schematic structural diagram of the second end provided by the embodiment of the present application.
Figure 4:
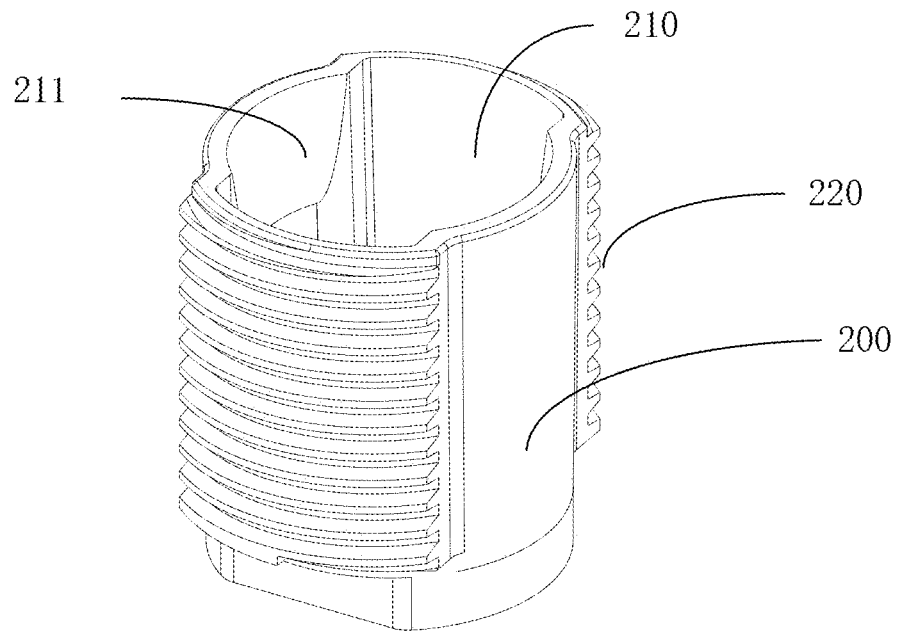
FIG. 4 is a schematic structural diagram of the first connector provided by the embodiment of the present application.
Figure 5:
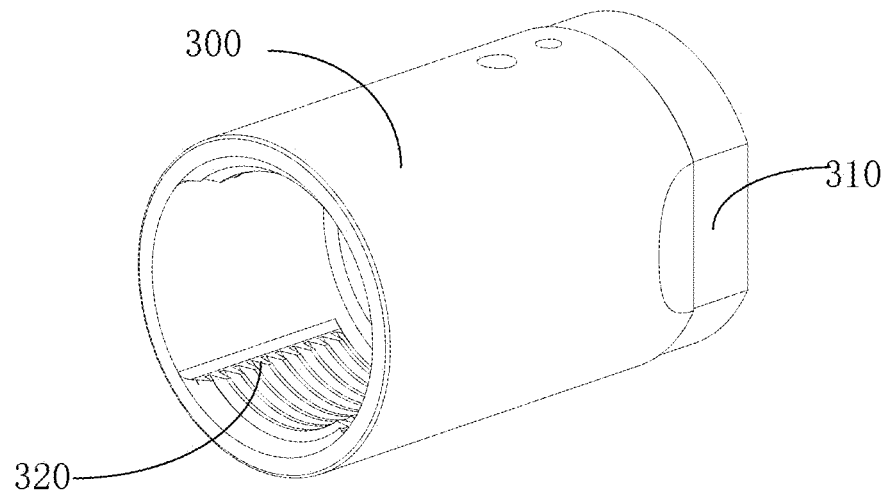
FIG. 5 is a schematic structural diagram of the second connector provided by the embodiment of the present application.
Figure 6:
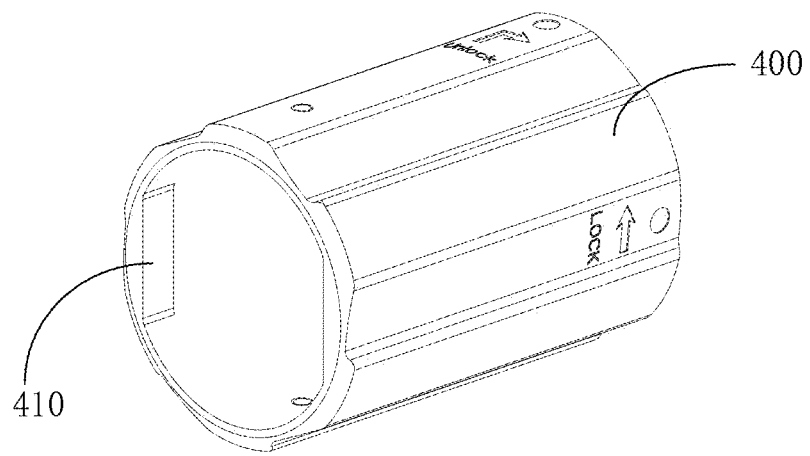
FIG. 6 is a schematic structural diagram of the sleeve provided by the embodiment of the present application.
Figure 7:
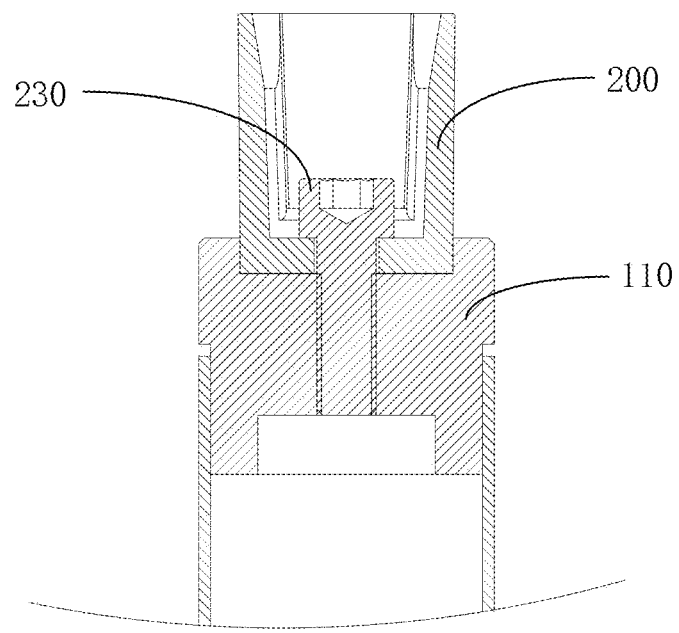
FIG. 7 is a cross-sectional view of the first connector installed on the first end according to the embodiment of the present application.
Figure 8:
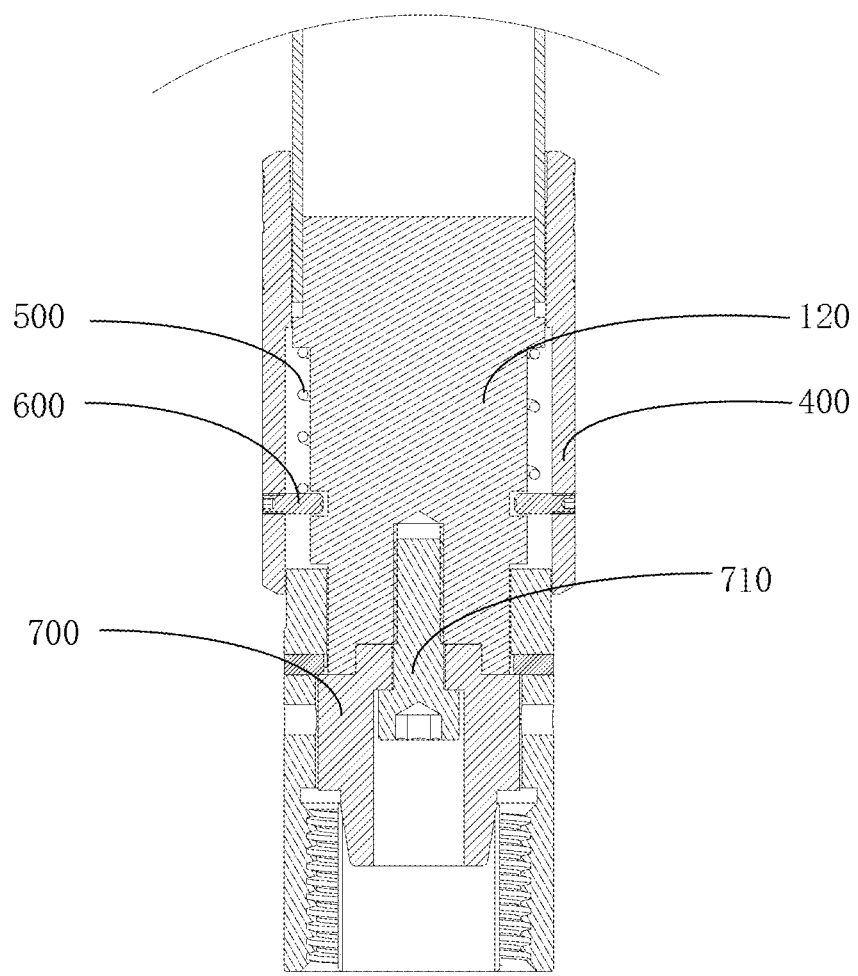
FIG. 8 is a cross-sectional view of the locking member disposed in the rotation groove according to an embodiment of the present application.
Figure 9:
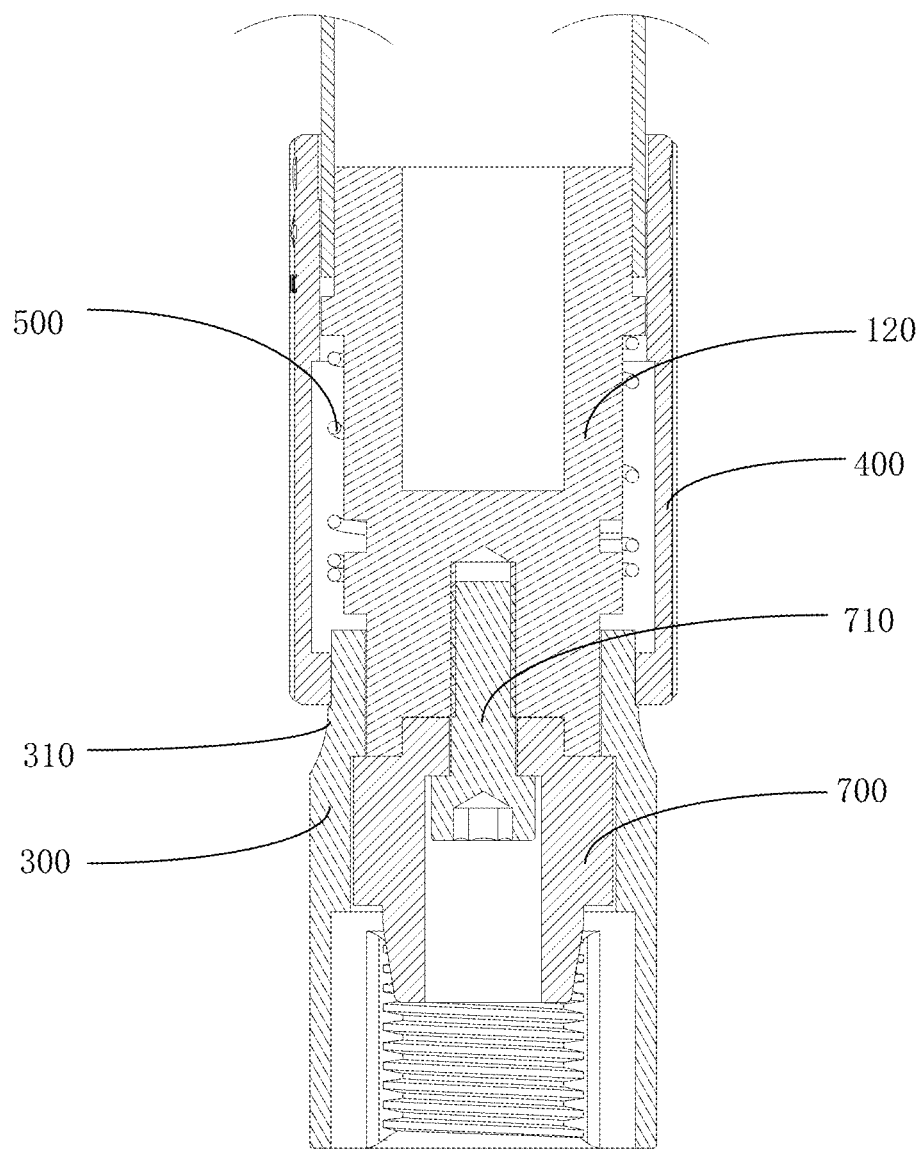
FIG. 9 is a cross-sectional view of the locking member without being disposed in the rotation groove according to an embodiment of the present application.
Figure 10:
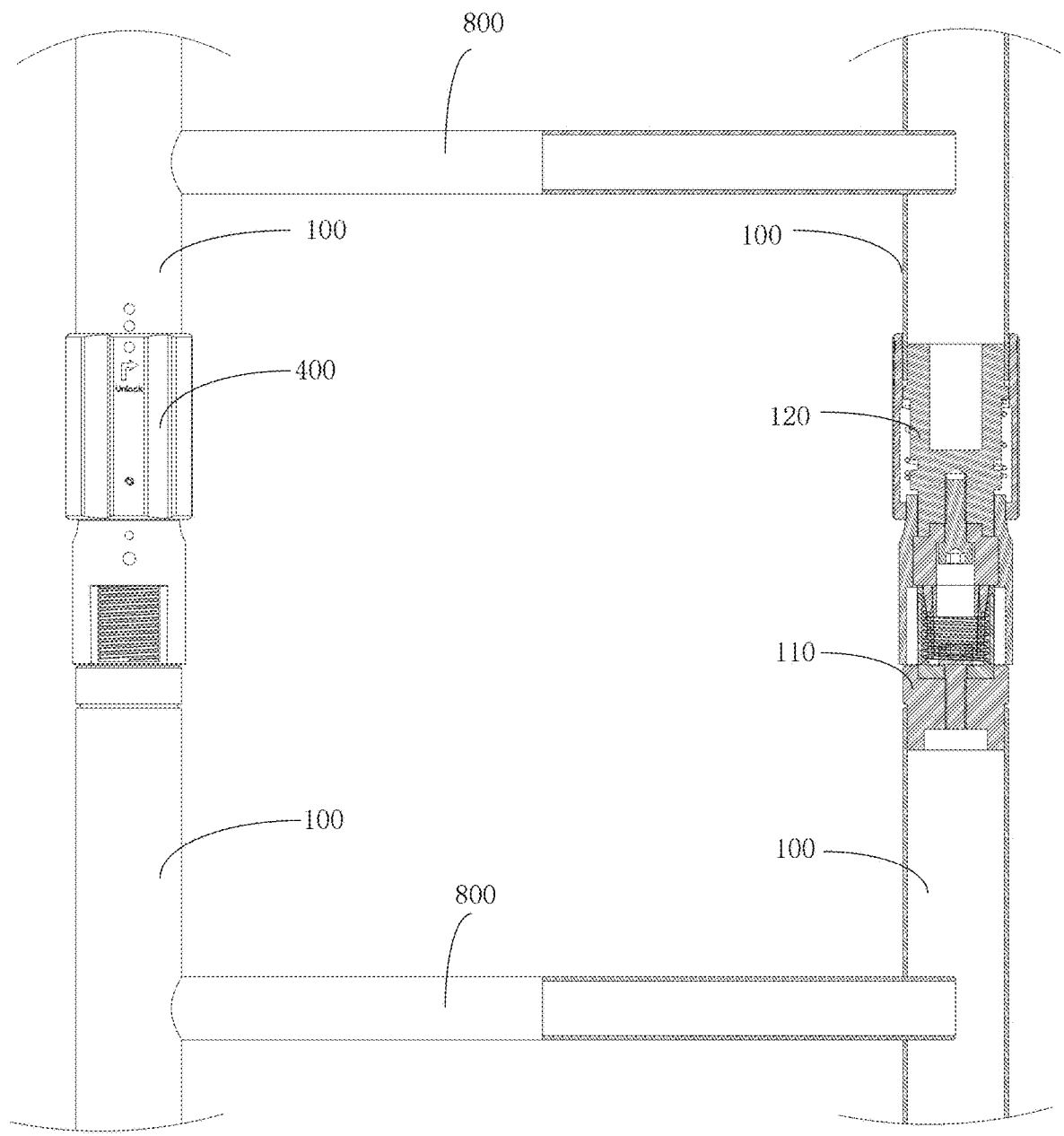
FIG. 10 is a schematic structural diagram of the connection between two adjacent mounting brackets according to an embodiment of the present application.
Figure 11:
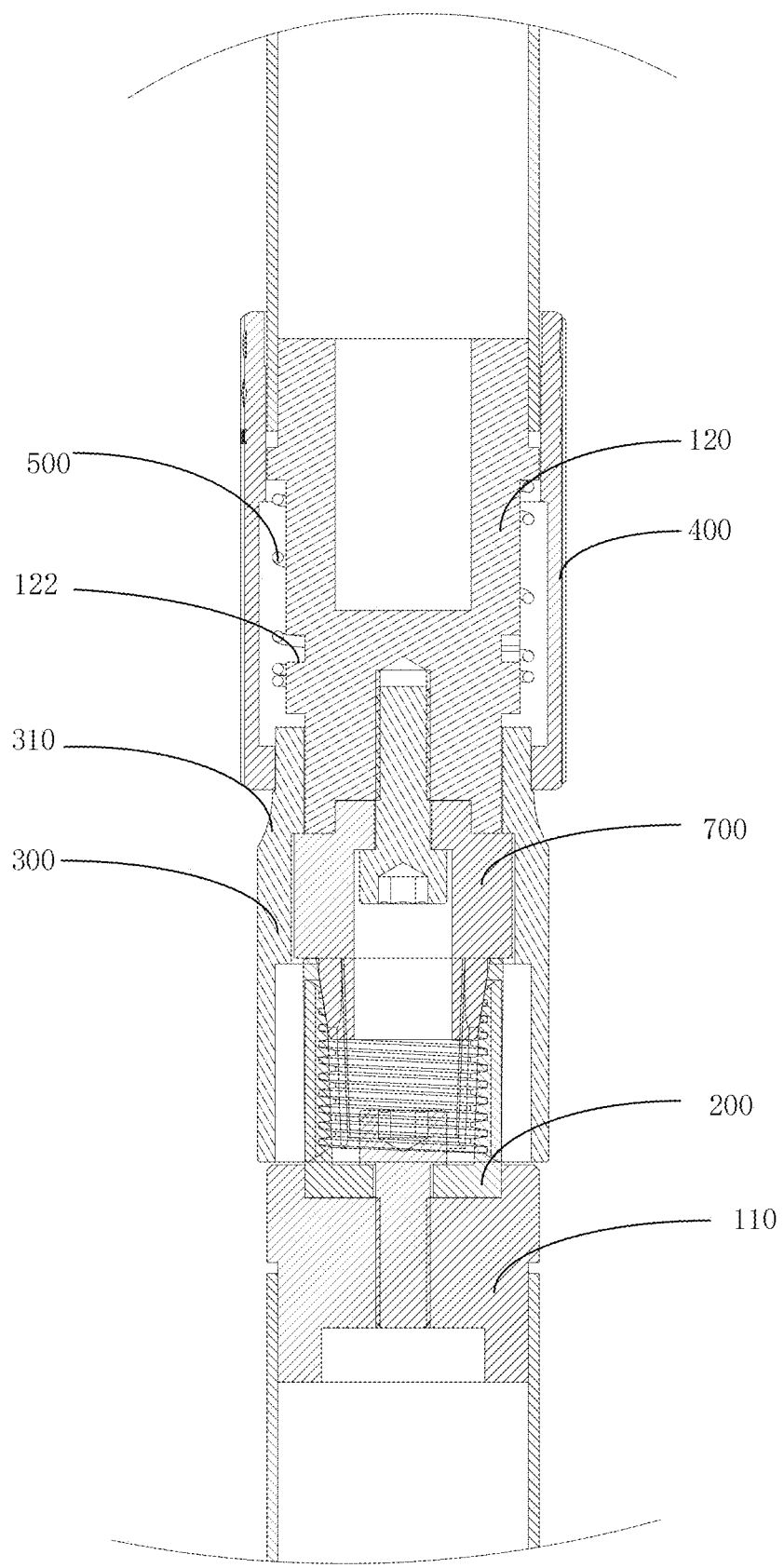
FIG. 11 is a cross-sectional view of the connection between two adjacent mounting brackets according to an embodiment of the present application.

More specifically, as shown in FIGS. 1 to 3, the locking groove 121 is provided below the rotation groove 122, the locking groove 121 extends along the first direction, the rotation groove 122 is formed along the circumferential direction of the second end 120, and the locking groove 121 communicates with the end of the rotation groove 122.

In some embodiments, as shown in FIGS. 1 to 11, the outer wall of the second connector 300 is provided with a first limiting surface 310, and the inner wall of the sleeve 400 is provided with a second limiting surface matching the first limiting surface 310, the sleeve 400 can slide in the first direction through the first limiting surface 310. By providing the first limiting surface 310 on the second connector 300 and the second limiting surface matching the first limiting surface 310 on the sleeve 400, the sleeve 400 slides along the first limiting surface 310, so that the direction of the second connector 300 is always consistent with sleeve 400.

It should be noted that the first limiting surface 310 extends along the first direction.

In some embodiments, the first limiting surface 310 is a curved surface recessed inwardly.

Specifically, as shown in FIGS. 1 to 11, a sliding section is provided on the outer wall of the second connector 300, and the color of the sliding section is different from the color of other surfaces. The sleeve 400 can slide along the sliding section.

In some embodiments, as shown in FIGS. 1 to 11, the mounting bracket further includes a limiting connector 700. The limiting connector 700 is disposed in the second connector 300 and connected to the second end 120. The limiting connector 700 can be engaged with the first connector 200 of an adjacent mounting bracket. By providing the limiting connector 700, when connecting two adjacent mounting brackets, the limiting connector 700 can be engaged with the first connector 200 of the adjacent mounting bracket, further enhancing the connection stability of the two adjacent mounting brackets.

Specifically, as shown in FIGS. 1 to 11, the limiting connector 700 is connected to the second end 120 through a second screw 710.

Specifically, as shown in FIGS. 1 to 11, the first connector 200 is provided with a first through-hole 210. A first tapered surface 211 is provided on the wall of the first through-hole 210, and a second tapered surface is provided on the outer wall of the limiting connector 700. The limiting connector 700 can partially extend into the first through-hole 210 of the first connector 200 of the adjacent mounting bracket, and the second tapered surface is fitted to the first tapered surface 211 of the first connector 200 of the adjacent mounting bracket. By providing the first tapered surface 211 and the second tapered surface, when two adjacent mounting brackets are connected, the limiting connector 700 is inserted into the first through-hole 210 of the first connector 200 of the adjacent mounting bracket, and the first tapered surface 211 of the first connector 200 and the second tapered surface of the limiting connector 700 are self-aligned to ensure the alignment accuracy of the two mounting brackets.

Specifically, as shown in FIGS. 1 to 11, one of the limiting connector 700 and the second connector 300 is provided with a protrusion, and the other one is provided with a recess, and the protrusion can be engaged with the recess. By providing the protrusion and the recess, when the limiting connector 700 and the second end 120 are connected, the protrusion is engaged with the recess, further enhancing the connection stability between the limiting connector 700 and the second connector 300.

In summary, in the mounting bracket provided by this application, the first connector 200 is provided with a first tapered surface 211, and the first connector 200 is connected to the first end 110 of the rod body 100 through the first screw 230, and is engaged and limited thereto.

The limiting connector 700 is provided with a second tapered surface. When two adjacent mounting brackets are connected, the limiting connector 700 is inserted into the first connector 200, and the first tapered surface 211 of the first connector 200 is self-aligned with the second tapered surface of the limiting connector 700, which ensures the alignment accuracy of the two mounting brackets.

The second connector 300 is provided with a first limiting surface 310 and a sliding section, and the color of the sliding section is different from the color of other surfaces. The second connector 300 is provided with a second thread 320 that is, when viewed from an axial direction, perpendicular to the first thread 220 of the first connector 200, when the second connector 300 is connected to the first connector 200, the second connector 300 only needs to be rotated by ¼ turn to achieve the connection and locking therebetween.

The sleeve 400 is provided with a second limiting surface 410 matching the first limiting surface 310, so that the direction of the second connector 300 is always consistent with the sleeve 400. At the same time, the sleeve 400 can slide on the sliding section of the second connector 300. The sleeve 400 rotates in the rotation groove 122 of the bracket through the restriction of the locking member 600.

When the mounting bracket is in the unlocked state, the second thread 320 of the second connector 300 is, when viewed from an axial direction, perpendicular to the first thread 220 of the first connector 200. The rotation of the sleeve 400 drives the second connector 300 to rotate, and after the second connector 300 and the first connector 200 are locked, the sleeve 400 forces the locking member 600 on the sleeve 400 to move into the locking groove 121 under the action of the elastic member 500. At this time, if the thread needs to be unlocked, the sleeve 400 must be lifted upwards, namely the locking member 600 must slide into the rotation groove 122, so as to achieve the safety of release of the thread.

The entire locking and unlocking action require only one component, namely the sleeve 400.

The present application further provides a display device, which includes a panel module, a cabinet module, a mounting bracket and any one of the above mounting brackets. The panel module is installed on the cabinet module, and the cabinet module is connected to the mounting bracket. By connecting the cabinet module to the mounting bracket in the display device provided by the present application, the risk of damaging the mounting bracket during use is reduced. The unlocking or locking process only requires operating the sleeve 400, which improves the efficiency of installation and disassembly of the display device, and enhances the safety, reliability, operability and product experience of the mounting bracket.

The various technical features of the above-described embodiments may be combined in any combination, and all possible combinations of the various technical features of the above-described embodiments have not been described for the sake of conciseness of description; however, as long as there is no contradiction in the combinations of these technical features, they should all be considered to be within the scope of the present description as described herein.

The above-described embodiments only express several implementation modes of the present application, and descriptions are relatively specific and detailed, but should not be construed as limiting the scope of the application. It should be noted that, for those of ordinary skill in the art, several modifications and improvements can be made without departing from the concept of the present application, and these all fall within the protection scope of the present application. Therefore, the protection scope of this application should be defined by the appended claims.

What is claimed is:

1. A mounting bracket, comprising:
   a rod body having a first end and a second end oppositely arranged along a first direction, the first direction being a lengthwise direction of the rod body;
   a first connector connected to the first end;
   a second connector connected to the second end; and
   a sleeve connected to the second end and sleeved on the second connector, the sleeve being capable of driving the second connector to rotate so that the second connector is connected to a first connector of a mounting bracket adjacent to the second connector along the first direction.

2. The mounting bracket of claim 1, further comprising an elastic member and a locking member, wherein the second end is provided with a locking groove, the locking member and the elastic member are both disposed in the sleeve, and the elastic member is sleeved on the second end, the sleeve is capable of driving the second connector to rotate, so that the elastic member pushes the locking member to be engaged with the locking groove.

3. The mounting bracket of claim 2, wherein a rotation groove is provided on the second end, the rotation groove extends along a circumferential direction of the second end, the locking groove extends along the first direction and is communicated with the rotation groove, the sleeve is capable of moving along the first direction relative to the second connector in order to drive the locking member to slide from the locking groove into the rotation groove.

4. The mounting bracket of claim 3, wherein an outer wall surface of the second connector is provided with a first limiting surface, and an inner wall surface of the sleeve is provided with a second limiting surface matching the first limiting surface, the sleeve can slide along the first direction through the first limiting surface.

5. The mounting bracket of claim 1, wherein the mounting bracket further comprises a limiting connector, the limiting connector is disposed in the second connector and connected to the second end, and the limiting connector is engageable into the first connector of the adjacent mounting bracket.

6. The mounting bracket of claim 2, wherein the mounting bracket further comprises a limiting connector, the limiting connector is disposed in the second connector and connected to the second end, and the limiting connector is engageable into the first connector of the adjacent mounting bracket.

7. The mounting bracket of claim 5, wherein the first connector is provided with a first through-hole, a wall of the first through-hole is provided with a first tapered surface, and an outer wall of the limiting connector is provided with a second tapered surface, the limiting connector can partially extend into a first through-hole of the first connector of the adjacent mounting bracket, and the second tapered surface is fitted to a first tapered surface of the first connector of the adjacent mounting bracket.

8. The mounting bracket of claim 5, wherein one of the limiting connector and the second connector is provided with a protrusion, and the other one is provided with a recess, and the protrusion is engageable with the recess.

9. The mounting bracket of claim 2, wherein a first thread is provided on an outer wall of the first connector, a second through-hole is provided on the second connector, and a second thread engageable with the first thread is provided on a wall of the second through-hole.

10. The mounting bracket of claim 9, wherein an outer wall surface of the first connector includes a first smooth part and a first mounting part arranged at intervals, the first mounting part is provided with the first thread, and the first smooth part is a smooth wall surface.

11. The mounting bracket of claim 10, wherein the wall of the second through-hole includes a second smooth part and a second mounting part arranged at intervals, the second mounting part is provided with the second thread, and the second smooth part is a smooth wall surface.

12. A display device, comprising a panel module, a cabinet, and a mounting bracket, wherein the panel module is installed on the cabinet, and the cabinet is connected to the mounting bracket; and wherein the mounting bracket comprises:

a rod body having a first end and a second end oppositely arranged along a first direction, the first direction being a lengthwise direction of the rod body;

a first connector connected to the first end;

a second connector connected to the second end; and a sleeve connected to the second end and sleeved on the second connector, the sleeve being capable of driving the second connector to rotate so that the second connector is connected to a first connector of a mounting bracket adjacent to the second connector along the first direction.

13. The display device of claim 12, wherein an outer wall surface of the first connector includes a first smooth part and a first mounting part arranged at intervals, the first mounting part is provided with a first thread, and the first smooth part is a smooth wall surface;

a second through-hole is provided on the second connector, a wall of the second through-hole includes a second smooth part and a second mounting part arranged at intervals, the second mounting part is provided with a second thread, which is engageable with the first thread.

14. The display device of claim 13, wherein the second end is provided with a locking groove and a rotation groove, the locking groove extends along the first direction, the rotation groove extends along a circumferential direction of the second end and is communicated with the locking groove;

the mounting bracket further comprises a locking member; the locking member is connected to an inner wall surface of the sleeve; by moving the sleeve in the first direction, the locking member is driven to switch between the locking groove and the rotation groove.

* * * * *